United States Patent [19]

Morse

[11] 3,709,622
[45] Jan. 9, 1973

[54] DRILL PRESS ATTACHMENT ASSEMBLY

[76] Inventor: Glenn B. Morse, 321 Fountain N.E., Grand Rapids, Mich. 49503

[22] Filed: Nov. 12, 1970

[21] Appl. No.: 47,774

[52] U.S. Cl. ..................408/20, 29/560, 144/1 C
[51] Int. Cl. ..............................................B27c 9/00
[58] Field of Search............408/20; 144/1 C; 29/560

[56] References Cited

UNITED STATES PATENTS

| | | | |
|---|---|---|---|
| 2,200,799 | 5/1940 | Miller | 144/1 C X |
| 2,623,269 | 12/1952 | Goldschmidt | 408/20 X |
| 2,768,663 | 10/1956 | Jones | 408/20 X |
| 2,963,057 | 12/1960 | Morse | 144/1 C |
| 3,073,193 | 1/1963 | Grant | 408/20 X |
| 3,470,789 | 10/1969 | Morse | 90/11 |

*Primary Examiner*—Gil Weidenfeld

[57] ABSTRACT

Lathe headstock and carriage members are mounted preferably on the column of a drill press, the headstock being driven by the power head of the drill press. The headstock and carriage are related in angular position about the axis of the column by a bar parallel to the column and fixed with respect to one of the members, and slideably engaging the other. The bar also stabilizes the sliding movement of the carriage against the forces of a feed screw displace laterally from the column.

19 Claims, 27 Drawing Figures

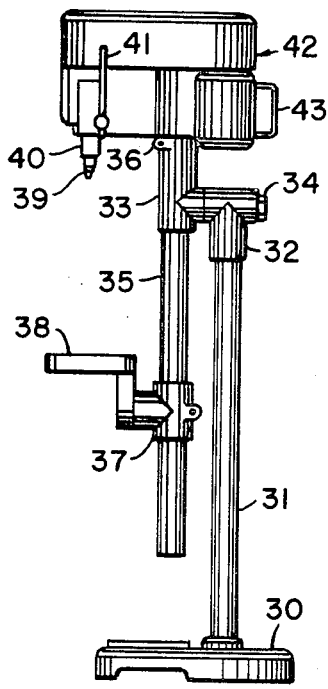
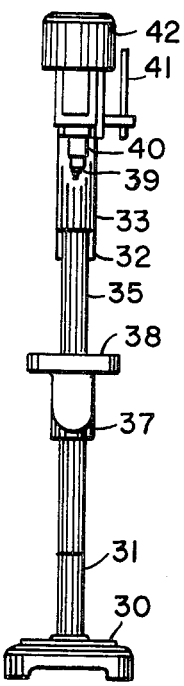
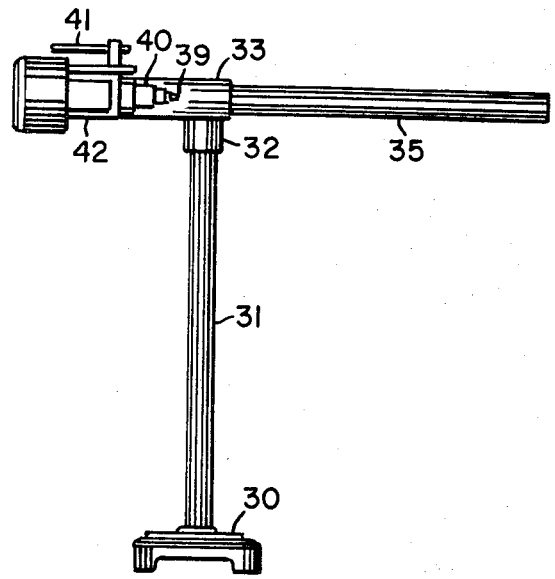
Fig. 1  Fig. 2  Fig. 3
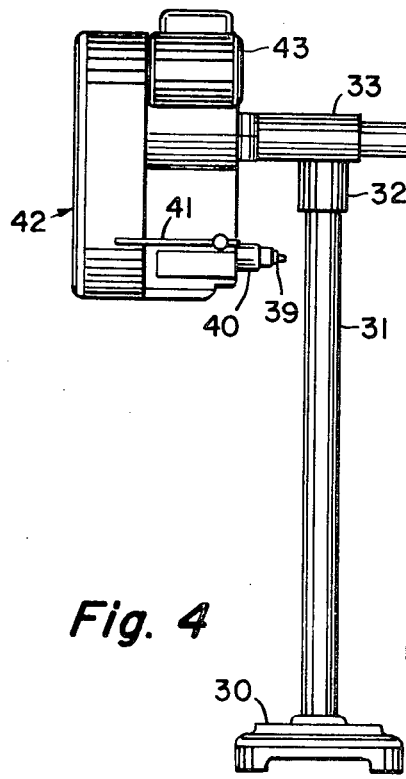
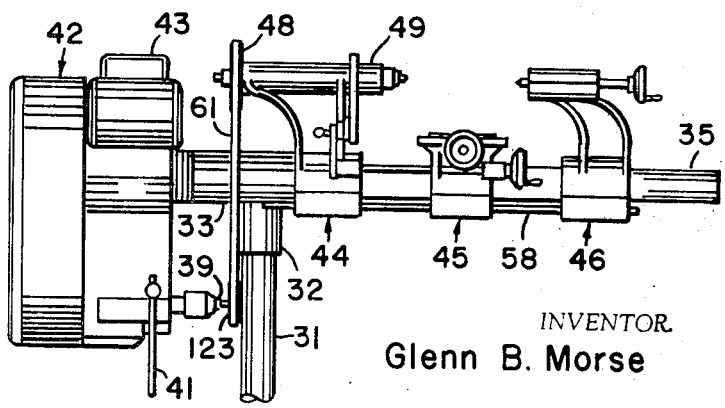
Fig. 4
Fig. 5
INVENTOR.
Glenn B. Morse INVENTOR
Glenn B. Morse

INVENTOR.
Glenn B. Morse

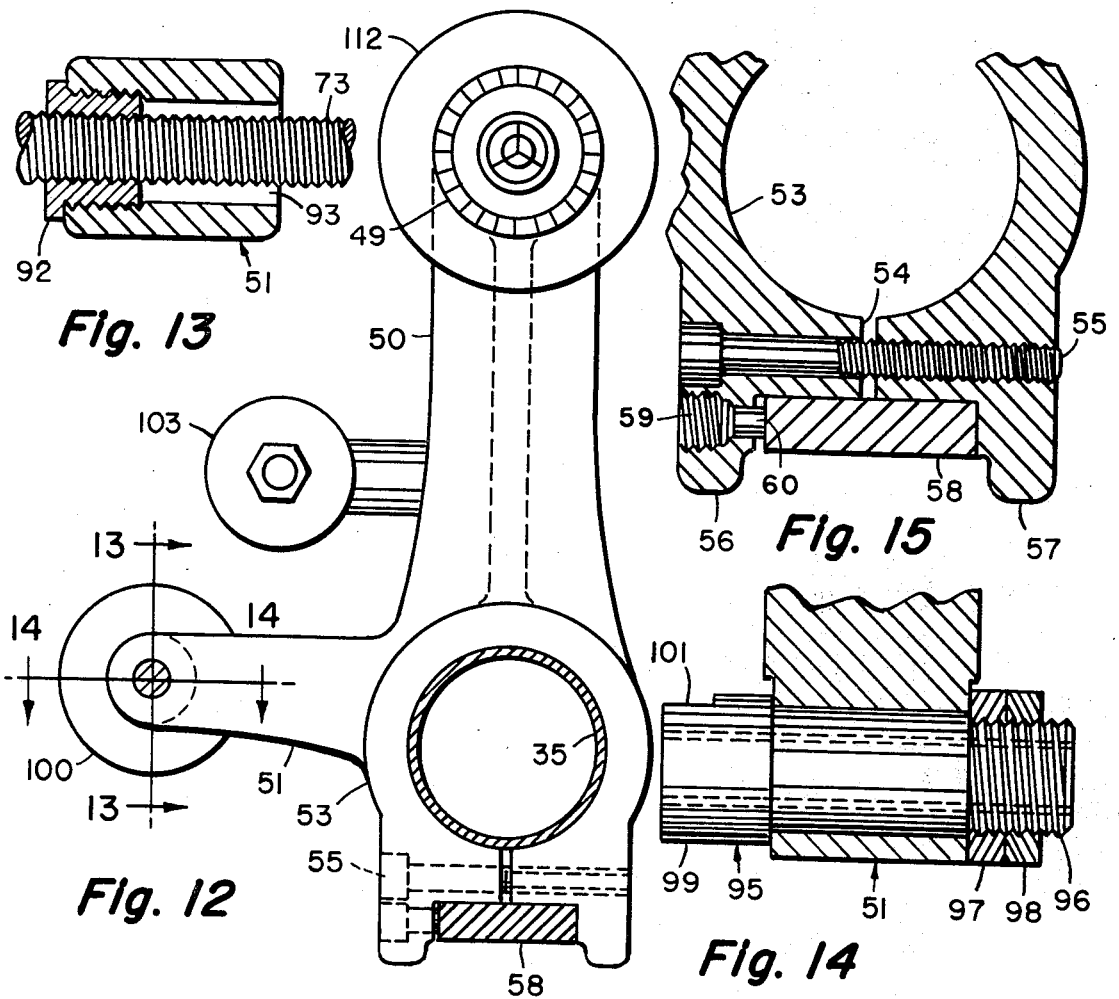
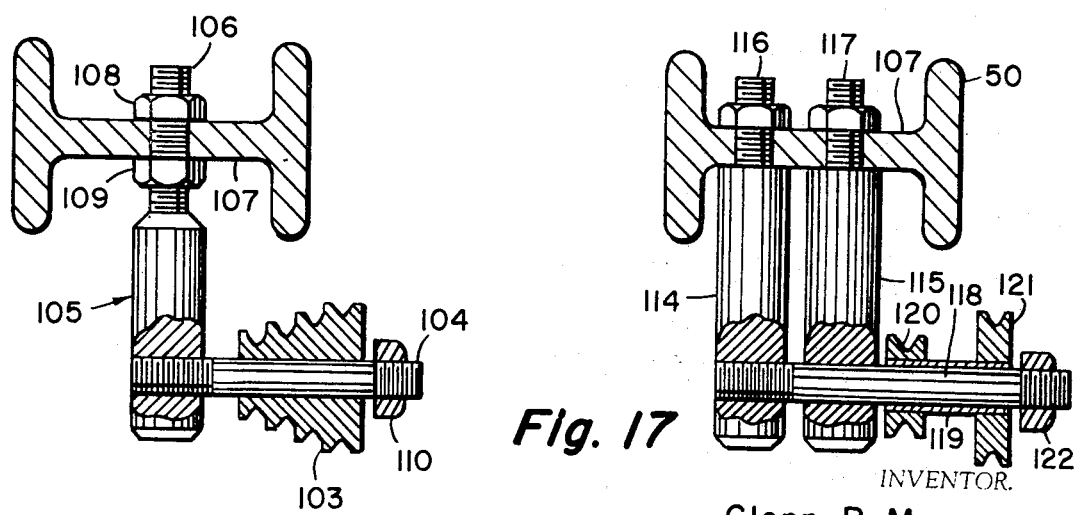

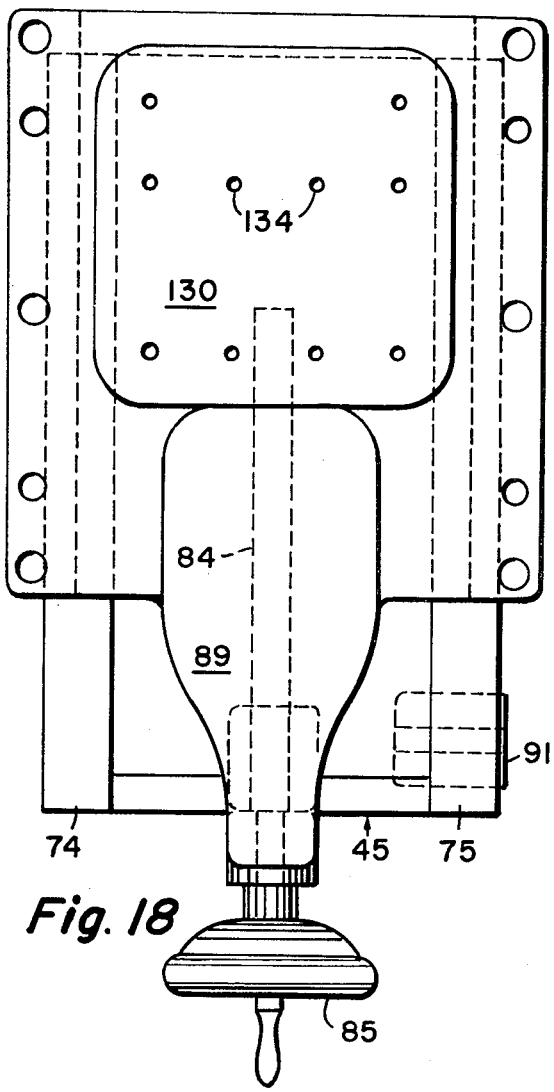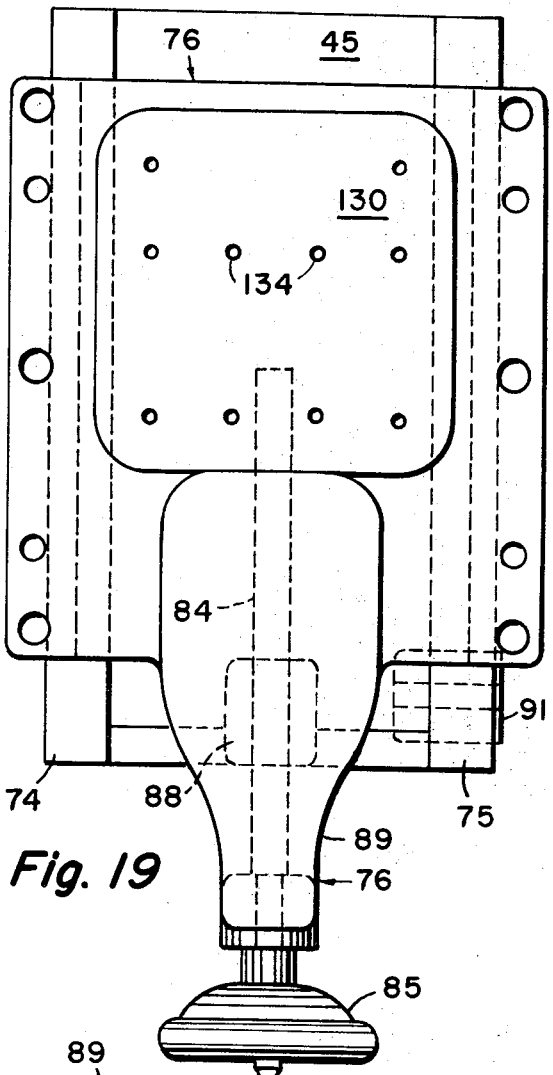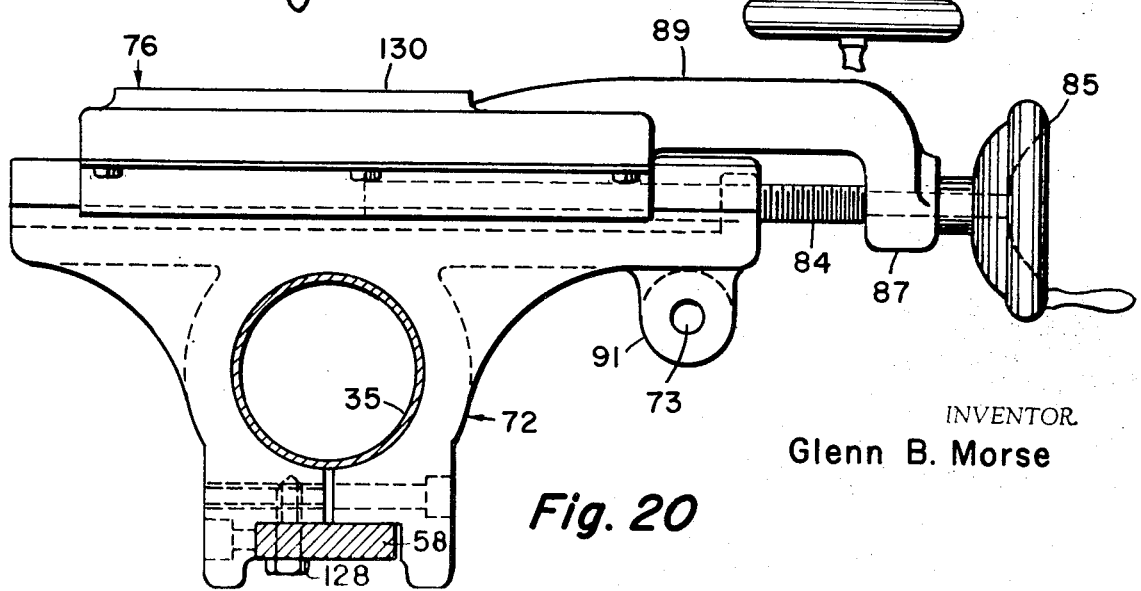

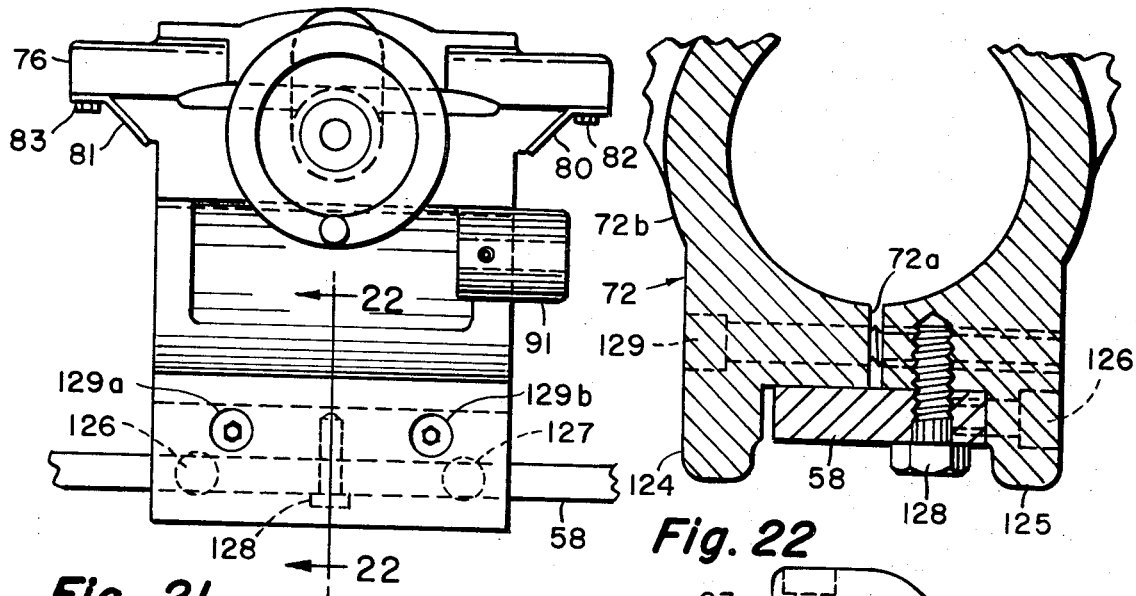
Fig. 21
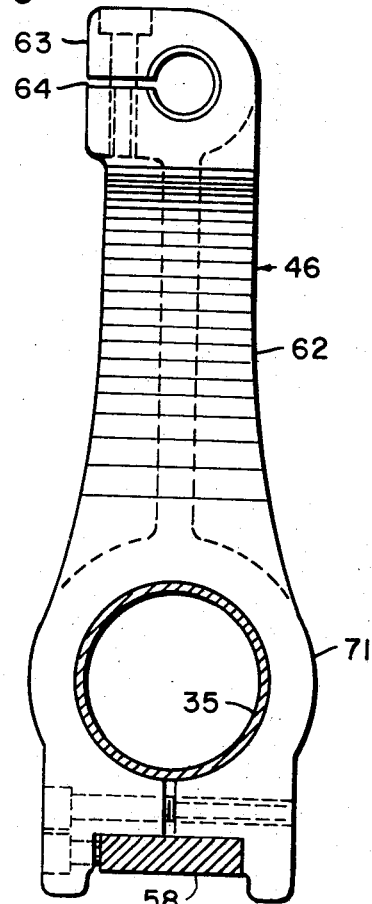
Fig. 22
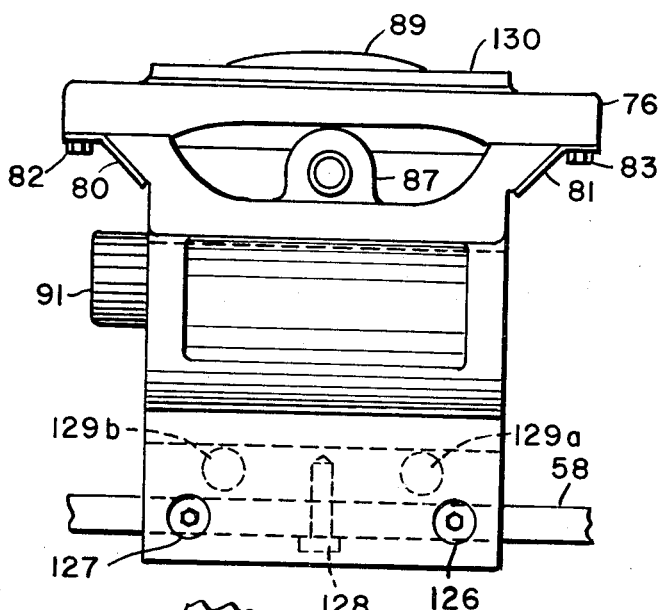
Fig. 23
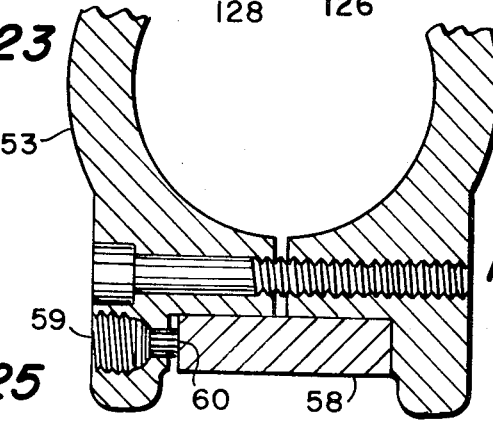
Fig. 25
Fig. 24
INVENTOR.
Glenn B. Morse

DRILL PRESS ATTACHMENT ASSEMBLY

BACKGROUND OF THE INVENTION

One of the most widely-used combinations of machine elements is the headstock-carriage-guideway assembly typified by the standard lathe. A power-driven spindle in the headstock holds either a work piece or a rotary cutting tool, and the opposite of these is held by the carriage, with the carriage moving along a guideway fixed with respect to the headstock to control the cutting operation. Modifications of this general assembly appear as milling machines and an endless variety of special purpose equipment. Heavy-duty machine work requires that these machines be designed and constructed with particular purposes in mind; and the machine is thus limited in function, and has a very substantial cost. There is a tremendous field, however, for the use of this type of machine on a light-duty or occasional use basis, and this sort of operation frequently will not justify the investment in the standard special-purpose equipment available to perform particular operations. Where a number of varied and small operations are to be performed more or less at random, the availability of floor space must also be considered. Enough special-purpose machines to satisfy such a need would frequently require the dedication of a large floor area to equipment which was subject to only occasional use.

It has been estimated that the most generally available piece of non-portable power equipment is the conventional drill press. Because of this general availability, attempts have been made to adapt the drill press to the basic lathe and milling machine operations where light-duty or occasional use is involved. The motivating force in these attempts has been the almost limitless marketing field represented by home workshop equipment. It has been recognized that the drill press represents not only a machine in its own right, but also a possible source of power and control for operating other items of equipment associated with it. The power head of the drill press can itself be used as a headstock, or confined to use as a source of power. The problem has always been the guideway interrelationship between the headstock and something equivalent to a carriage. The conventional drill press does not have much of anything that can be used to align the movement of a carriage with respect to the spindle axis of a headstock in order to assure that a cutting action is cylindrical, rather than tapered or erratic. The problem of deflection is also critical in any attempt to incorporate a lathe configuration in a drill press. These problems have resulted in a variety of different approaches by machine designers. One of these is to mount a small lathe on the table of a drill press, and drive it from the power head of the drill press with a suitable belt. This arrangement is of course entirely practical, but leaves the matter of cost essentially untouched. The entire cost of the lathe is still present, and the only economy has been effected through the use of the motor of the drill press, rather than requiring a separate motor installation. Another approach is represented by my U.S. Pat. No. 3,470,789, on which a complete small lathe-milling machine unit is mounted on the spindle sleeve of the drill press, thus automatically creating the necessary alignment between the carriage and the axis of the spindle. This is highly satisfactory for relatively small cutting operations, but runs into practical limitations when larger and longer work pieces are involved.

In order to reduce the cost that seems to be inherent in the construction of a lathe or milling machine, it becomes desirable to utilize the column of the drill press as a guideway, thus eliminating a large and expensive component from the standard machine assembly. The problem here is two-fold. One aspect of the problem arises from the circular exterior cross-sectional configuration of the drill press column, which requires some auxiliary arrangement for aligning the components mounted on the column in an angular relationship about the column axis. The other aspect of the problem arises from the general roughness of the surface of the usual drill press column, particularly after it has been subject to rusting and accidental scarring. Any practical form of feed screw which controls the movement of the carriage must also be laterally displaced from the column, thus applying a rather substantial force in a position considerably eccentric to the friction forces generated by the movement of the carriage on the column. As the distance from the feed screw to the column axis increases, a point is quickly reached where a jamming action is produced which locks the carriage against movement along the column, regardless of the amount of force applied by the feed screw. Even where the column is treated in its originally-manufactured form, and even though it may be given a high degree of polish and lubrication, this problem is still present. Under the usual surface conditions to be expected after a drill press column has been exposed to shop or basement conditions for a considerable length of time, it may be assumed that a jamming action is likely to be encountered whenever the feed screw is displaced from the column axis anything more than about the distance of axial engagement of the carriage with the column. The precise location where the jamming action develops will be influenced very substantially by the surface conditions on the column. The present invention provides a workable answer to these problems, which has been adapted particularly to the type of drill press shown in my U.S. Pat. No. 2,963,057. This invention is not limited to such a drill press, however.

SUMMARY OF THE INVENTION

Headstock and carriage members are interrelated in angular position about the axis of a supporting beam by an auxiliary bar mounted in a position parallel to the beam axis, and fixed with respect to one of the members. The bar slideably engages the other of the members. This arrangement not only interrelates the angular position of the members, but also has the effect of increasing the effective length of the member sliding on the beam to practically eliminate any jamming tendency resulting from the application of feed screw forces. The most effective form of this assembly involves the additional use of a tailstock, as well as a headstock, with a bar fixed with respect to the carriage interposed between these members. The bar slideably engages both the headstock and tailstock, thus providing a length of effective bearing engagement which produces a maximum degree of stability. The bar, in both cases, is preferably rectangular in configuration, with the greatest dimension of the cross-section in a tangential direction with respect to the column axis, thus providing the greatest degree of stiffness which controls the angular relationship of the carriage and headstock. For the carriage to move rotatably about the column, it is obviously necessary to bend this bar against its major cross-sectional dimension. The bar is preferably received in outwardly-open recesses in each of the members mounted on the column, which makes it possible to install these members on the column separately, followed by the placement of the alignment bar after the members have been approximately aligned by eye.

DESCRIPTION OF THE DRAWINGS

FIG. 1 is a side elevation of a type of drill press with which the present invention has its maximum utility.

FIG. 2 is a front elevation of the drill press shown on FIG. 1, FIGS. 1 and 2 being in projection.

FIG. 3 is a front view showing the upper column and power head of the drill press rotated to a horizontal position about the column pivot.

FIG. 4 shows the assembly rotated ninety degrees about the axis of the upper column from the position shown in FIG. 3. In FIGS. 3 and 4, the table assembly of the drill press has been removed from the upper column.

FIG. 5 is a view on enlarged scale showing the installation of the machine components on the upper column, with the drill press in the FIG. 4 position.

FIGS. 7, 8, and 9 are in projection.

Figures 10, 11:
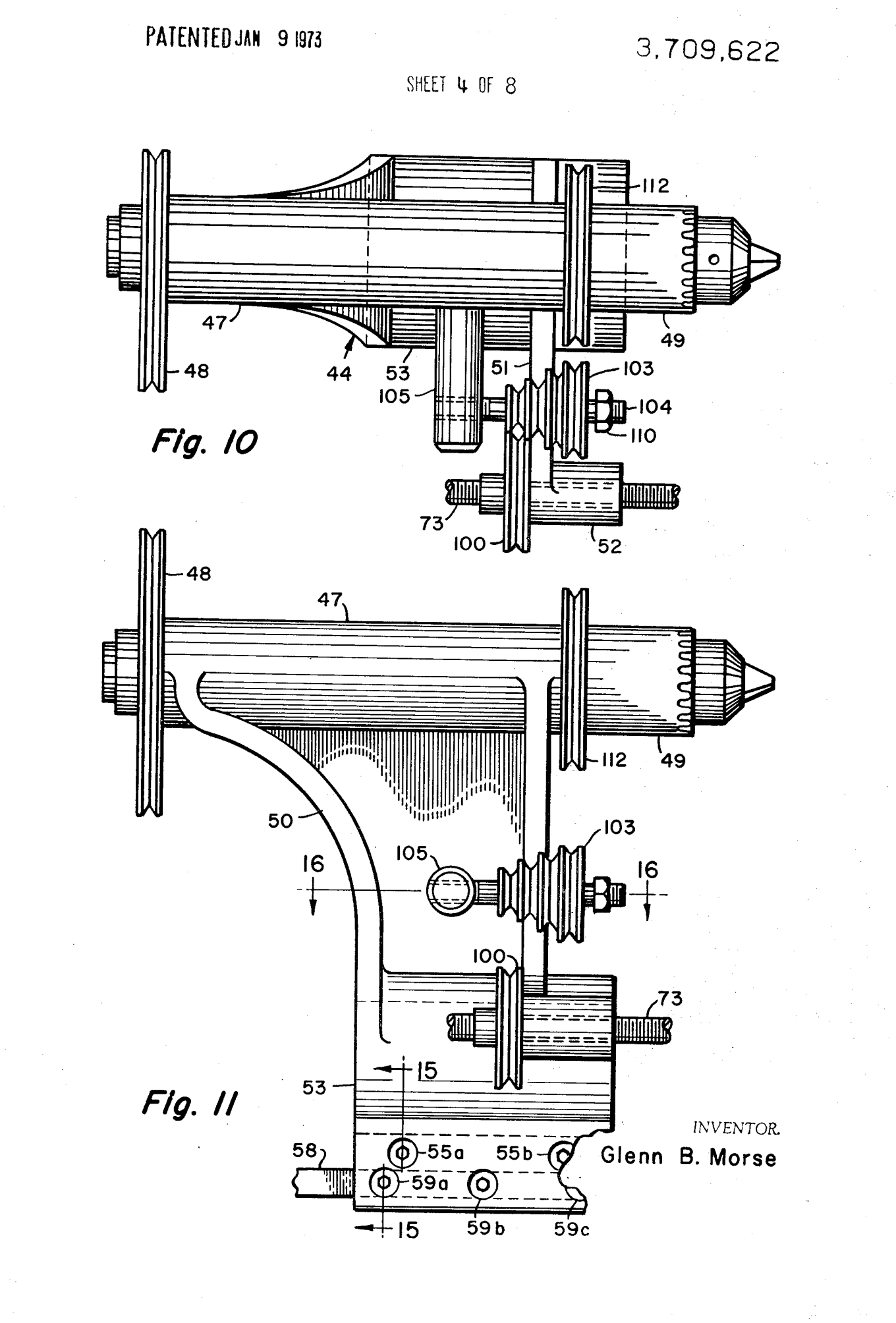

FIG. 10 is a plan view on enlarged scale showing an automatic feed arrangement for the machine.

FIG. 11 is a front view of the mechanism shown in FIG. 10. FIGS. 10 and 11 being in projection.

FIG. 12 is a section on a plane perpendicular to the axis of the column, providing an end view of the headstock.

FIG. 13 is a section on the plane 13—13 of FIG. 12, on an enlarged scale.

FIG. 14 is a view on the plane 14—14 of FIG. 12, on an enlarged scale, showing an automatic feed attachment installation replacing the hand feed arrangement illustrated in FIG. 13. In FIG. 14, the feed screw drive wheel is removed.

FIG. 15 is a section on the plane 15—15 of FIG. 11, on an enlarged scale.

FIG. 16 is a section on the plane 16—16 of FIG. 11, on an enlarged scale.

FIG. 17 is a view similar to FIG. 16, showing a modification of the construction.

FIG. 18 is a top view of the cross-slide and carriage assembly, on an enlarged scale.

FIG. 19 is a view similar to FIG. 18, showing an intermediate position of the cross-slide on the carriage.

FIG. 20 is a view on a plane perpendicular to the axis of the column, providing an end view of the carriage and cross-slide assembly.

FIG. 21 is a front view of the carriage and cross-slide assembly.

FIG. 22 is a section on the plane 22—22 of FIG. 21, on an enlarged scale.

FIG. 23 is a rear view of the assembly shown in FIG. 21.

FIG. 24 is a view on a plane perpendicular to the axis of the column, providing an end view of the tailstock assembly.

FIG. 25 is a view similar to FIG. 15, but showing the interengagement of the tailstock with the stabilizing bar.

DESCRIPTION OF THE PREFERRED EMBODIMENTS

Figure 6:
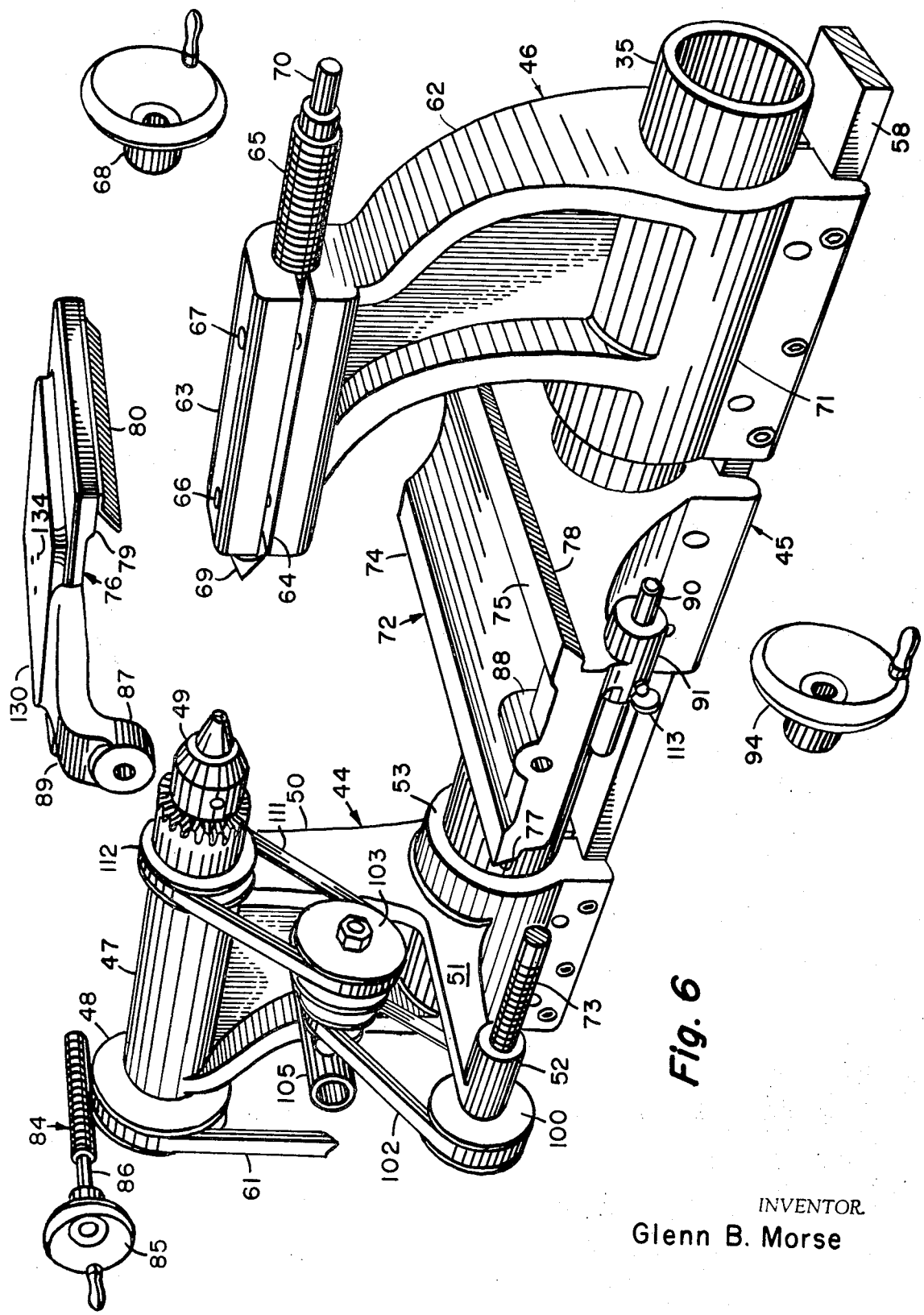
FIG. 6 is a perspective view on an enlarged scale showing the headstock, tailstock, and carriage mounted on the column as shown in FIG. 5, with the cross-slide assembly removed from the carriage for clarity. The cross-slide is shown directly above its normally assembled position, and the control wheels are shown separated from their normal mounting for further clarity.
Figure 7:
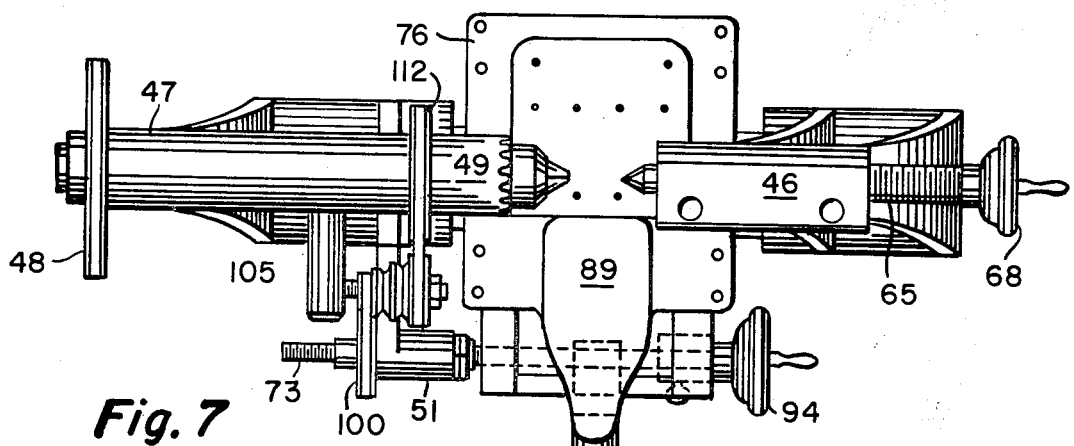
FIG. 7 is a top view of the assembly shown on FIG. 5, on an enlarged scale over FIG. 5.

FIGS. 1 and 2 illustrate a type of drill press described and claimed in my U.S. Pat. No. 2,963,057. The base 30 supports a fixed column section 31 provided with a fulcrum member 32. A cross-pin (not shown) is secured to the sleeve 33, and functions as a journal rotating within a bearing bore provided by the fulcrum member 32. This journal pin is secured by the nut 34, which provides an adjustable degree of resistance to rotation. The upper column section 35 is slideable and rotatably received within the sleeve 33, which can be tightened about the column 35 by adjustment of the screw 36. A bracket 37 is adjustably secured to the upper column section 35, and supports the table 38. This table supports work pieces, when the device is used in its usual manner as a drill press. The conventional chuck 39 is mounted in the axially extendable quill assembly 40, with the downward feed movement being controlled by the conventional handle 41. The power head assembly generally indicated at 42 is conventional, and receives its driving energy from the standard electric motor 43.

The machine shown on FIGS. 1 and 2 is placed in condition to receive the components of the present invention by first rotating the column 35 about the horizontal axis of the column fulcrum into the FIG. 3 position. The clamp screw 36 is then loosened slightly, and the power head (together with the column 35) are rotated ninety degrees about the axis of the sleeve 33, so that the chuck 39 swings downwardly into the FIG. 4 position. The screw 36 is then preferably tightened. The column 35 is also preferably locked in the horizontal position, either by tightening the nut 34, or by the use of an auxiliary locking screw (not shown). The placement of the upper column 35 in the horizontal position makes it much easier to slip off the table bracket 37 and the table 38, and this sub-assembly is placed somewhere for convenient temporary storage.

Figure 8:
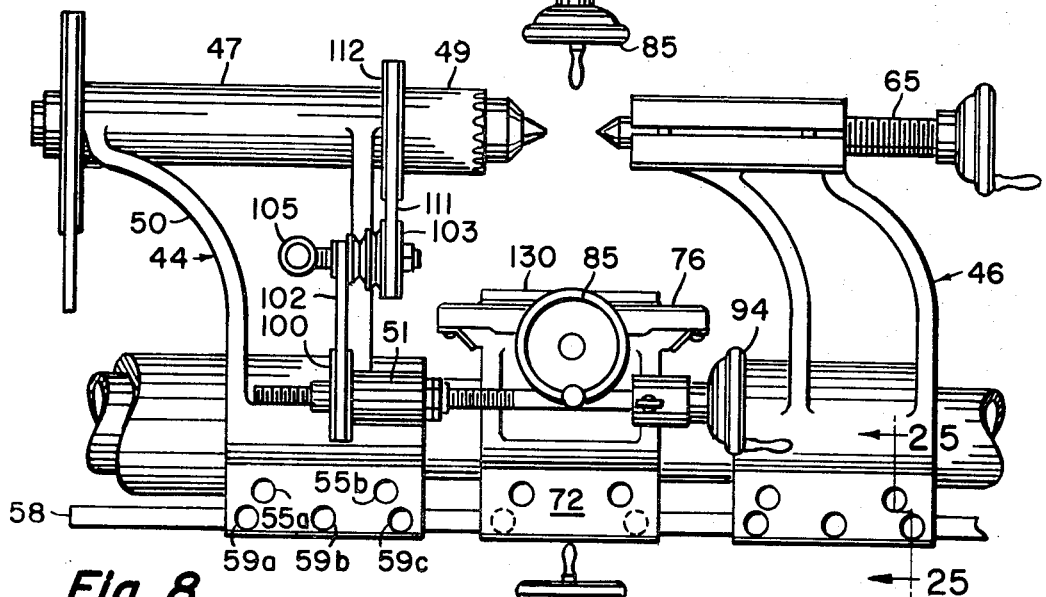
FIG. 8 is a front elevation of the assembly shown in FIG. 7.
Figure 9:
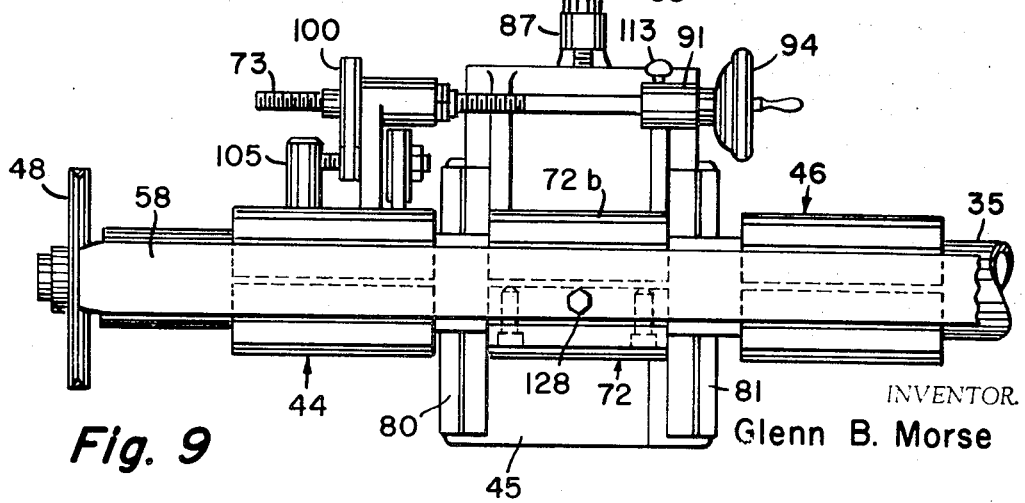
FIG. 9 is a bottom view of the assembly shown in FIG. 8.

With the basic machine in the FIG. 4 condition, the headstock assembly 44, the carriage 45, and the tailstock assembly 46 may be slipped on over the right end of the column 35 into the position shown in FIG. 5. These components are shown best in their assembled relationship in FIGS. 6 and 8. The headstock assembly includes a frame casting providing a bearing section 47 containing the usual bearing inserts for rotatably supporting a shaft carrying the drive pulley 48 on one end and the chuck 49 at the other. A vertical section 50 of the frame provides the necessary spaced relationship between the axis of the chuck 49 and the column 35. A laterally extending arm 51 supports a feed screw nut 52, and a sleeve portion 53 of the frame casting embraces the column 35. Referring to FIGS. 12 and 15, the portion 53 of the frame casting is slotted at 54 to produce a limited degree of peripheral resilience so that the clamping bolt 55 can be adjustably tightened to produce the desired degree of constriction upon the column tube 35. The bolt 55 traverses a suitable hole in the left side of the portion 53 of the frame casting, as viewed in FIG. 15, with clearance, and has threaded engagement with the portion of the frame 53 on the right side of the slot 54.

The portion 53 of the frame casting is also provided with the downwardly-extending walls 56 and 57 providing an inverted U-shaped configuration defining a recess within which the stabilizing bar 58 is received. In the preferred form of the assembly shown in FIGS. 6 and 8, the bar 58 slideably engages the frame section 53 for movement in a direction parallel to the axis of the column 35. The right side of the bar 58 bears directly against a machined surface of the wall 57, and the width of the recess receiving the bar 58 is sufficient to provide clearance at the left side of the bar, as shown in FIG. 15. A set screw 59 is in threaded engagement with the wall 56, and drives a small rivet-shaped brass slug 60 into bearing engagement with the side of the bar 58. The adjustability provided by the set screw 59 controls the degree of resistance to sliding movement between the bar and the headstock assembly, and is provided to eliminate all lost motion at this point. Any looseness in this area will inevitably result in some degree of angular misalignment between the headstock assembly and any other member receiving its alignment from the bar 58. In the normal case, the headstock assembly is slipped into the desired position shown best in FIG. 8. The clamping bolts 55 a and 55 b are then tightened to generate a solid clamping action that will result in fixing the position of the headstock with respect to the column 35. The set screws 59 a, b, and c are left loose until the remaining components have been installed, as the bar 58 is preferably the last element to be incorporated in the assembly. Referring to FIG. 5, the headstock assembly is preferably installed as closely as possible to the end of the member 33, so that the reach-over characteristic of the left portion of the frame casting will be sufficient to place the drive pulley 48 in a vertical plane to the left of the junction between the portion of the sleeve 33 which is parallel to the column 35, and the portion extending laterally therefrom over to the fulcrum member 32. The latter portion represents a beam section transverse to the beam section provided by the column 35 and sleeve 33. If this relationship is maintained, the drive belt 61 can operate without interference.

The tailstock assembly is based upon a frame casting having a vertical arm 62 of a I-shaped configuration in horizontal plane. An enlargement 63 at the upper extremity of this arm is slotted at 64 to provide a peripheral clamping action around the center screw 65. This clamping action is generated by the bolts 66 and 67. When the bolt are loosened, the handle wheel 68 is used to rotatably adjust the screw 65 so that the pointed end 69 of the screw is in the correct axial position to receive whatever work piece happens to be mounted in the machine. The control wheel 68 is mounted on the section 70 of the screw 65 having a reduced diameter. The frame casting of the tailstock assembly has the clamping section 71, which is constructed identically to that of the clamping section 53 of the headstock assembly.

The carriage 72 is interposed between the headstock and the tailstock, and moves axially under the control of the feed screw 73. The top horizontal surfaces 74 and 75 of the carriage are preferably ground to a smooth finish to provide for the support of the cross-slide 76. The cross-slide 76 is provided with the bearing surfaces 79 along its opposite edges which are received on the surfaces 74 and 75 of the carriage. The retaining strips 80 and 81 are secured to the cross-slide 76 by the bolts 82 and 83, and these strips engage the beveled surfaces 77 and 78 to maintain the alignment of the cross-slide with respect to the carriage. In view of the desirability of maintaining the minimum cost in the construction of this machine, it should be noted that the construction of the strips 80 and 81 from sheet steel on the order of a sixteenth of an inch thick makes is possible to utilize an angular cross-sectional configuration such that the tightening of the bolts 82 will generate a degree of resilient force against the surfaces 77 and 78. This type of alignment minimizes the tolerence requirements in the initial manufacturing of the machine, as the cross-slide is solidly supported on interengaged horizontal surfaces that are machined with standard equipment with a minimum of difficulty.

The movement of the cross-slide with respect to the carriage is under the control of the transverse feed screw 84, manipulated by the handle wheel 85. This screw has an unthreaded portion of reduced diameter 86 rotatably received (and is axially fixed) in the enlargement 87 (refer to FIG. 6), and the threaded portion of the screw 84 is engaged with the boss 88 on the carriage. The over-arm 89 (refer to FIG. 20) of the cross-slide reaches over the boss 88, so that the axis of the screw 84 can be positioned coaxially with the threaded bore of the boss 88.

Movement of the carriage assembly (including the cross-slide) in a direction parallel to the axis of the column 35 is provided by the action of the feed screw 73. This screw has a portion of reduced diameter 90 rotatably received within the boss 91 of the carriage so that the feed screw remains axially fixed with respect to the carriage. In the modification shown on FIG. 13, the insert 92 is secured in the bore 93, either with a press-fit or with the threaded engagement illustrated in FIG. 13. If the threading is used, the insert 92 should be tightened solidly so that the resistance to rotation with respect to the arm 51 is considerably in excess of that with respect to the feed screw 73. Rotation of the feed screw 73 with respect to its threaded engagement with the insert 92, under the control of the handle 94 engaging the portion 90 of the feed screw, will result in moving the carriage one way or the other, depending upon the direction of rotation.

FIG. 14 illustrates an arrangement for providing automatic feed for the carriage assembly by replacing the insert 92 with the special nut 95 rotatably received in the bore 93 of the arm 51. The nut 95 is internally threaded for engagement with the feed screw 73, and has an external threading 96 at the end for receiving the lock nuts 97 and 98. These nuts are adjusted to a particular axial position with respect to the shoulder provided by the head 99 to bear upon opposite machine surfaces on the arm 51 with a minimum of lost motion. A drive pulley 100 is mounted on the head 99, with the usual set screw engaging the flat 101. A short belt 102 extends to a step-pulley idler 103 mounted for free rotation on the shaft 104 supported by the pillar 105 shown in FIG. 16. This pillar has a threaded extension 106 traversing the web 107 of the portion 50 of the headstock casting, and is locked in a selected position by the nuts 108 and 109. It is preferable for the threaded portion 106 to pass freely through a hole in the web 107; but if it happens to be desirable to do so, the portion 106 can have threaded engagement with the web, with the result that a single lock nut would be required. The shaft 104 may be provided with either a threaded engagement or a press fit in the pillar 105. A retainer nut or clip 110 is preferable at the end of the shaft 104, although no attempt need be made to accurately place the pulley 103 along its own axis. Its position is preferably left to the effect of the belt 102 and the belt 111. The latter belt engages a pulley 112 fixed with respect to the shaft (not shown) supporting the chuck 49, with the result that the arrangement amounts to a power take-off from this shaft for driving the automatic feed system.

This feed system operates upon a delivery of power to the nut, rather than to the feed screw directly. Since the feed screw normally rotates freely with respect to the carriage, rotation of the nut 95 by this power transfer system will result in no action until the rotation of the feed screw is stopped. Frictional resistance between the feed screw and the nut will normally result in rotation of the feed screw along with the nut 95, until the feed screw is forcibly restrained against rotation. This restraint can either be applied manually by gripping the wheel 94, or may be semi-permanently effected by tightening the thumb bolt 113. This bolt is in threaded engagement with the boss 91, and is in position to bear against the journal portion 90 of reduced diameter of the feed screw 73.

The modification shown in FIG. 17 is functionally the same as that of FIG. 16, but utilizes a double support for the idler shaft in the form of the two pillars 114 and 115. These members have threaded portions of reduced diameter 116 and 117 preferably traversing holes in the web 107 of the portion 50 of the headstock casting. The use of holes somewhat larger than the diameter of the threaded extensions 116 and 117 permits a degree of position adjustability, which can be secured by tightening the nuts engaging these threaded portions. The idler shaft 118 may be in threaded engagement with the pillar 114, in which case it should be axially freely received in the pillar 115. The tubular section 119 functions as a body portion of a pulley, carrying the grooved sections 120 and 121. The retainer 122 functions in the same manner as the retainer 110 shown in FIG. 16. The double arrangement shown in FIG. 17 has a tendency to provide greater position stability for the idler shaft 119, but it should be noted that this is not usually a critical problem. Rotation of the FIG. 16 assembly about the axis of the pillar 105 can be utilized as a means of equalizing the tension on the belts 102 and 111.

The procedure for assembling the equipment shown in position in FIG. 5 will normally begin by slipping the headstock assembly over the right end of the column 35 into the position where it is close to or tightly against the sleeve 33. The bolts 55 (referring to FIGS. 8 and 15) may then be tightened to maintain the position of headstock on the column. The drive belt 61 is then normally slipped over the power head 42 of the drill press, and a drive pulley 123 is engaged in the chuck 39. The belt 61 is then engaged with the pulleys 123 and 48, and the headstock is now equipped with power. The carriage assembly 45 is then slipped over the column 35, followed by the tailstock assembly 46. The problem now is to angularly position these components about the axis of the column 35. This angular placement is initially done "by eye," until the bar 58 may be engaged in the recesses to the underside of these members. The walls 124 and 125 define the inverted U-configuration in the underside of the carriage in the same manner as the walls 56 and 57 on the headstock. When the bar 58 can be inserted fully in the recess between the walls 124 and 125, the screws 126 and 127 are engaged. These screws traverse the wall 125, and have threaded engagement with the side of the bar 58. Tightening of these screws draws the bar 58 solidly against the machined inside surface of the wall 125, as shown in FIG. 22. The tightening of these screws, followed by the installation and tightening of the screw 128 has the effect of fixing the bar 58 with respect to the carriage assembly. The bolts 129 are then tightened just sufficiently to eliminate any looseness of the carriage on the column 35. The slot 72 a in the sleeve portion 72 b produces the same peripheral resilience discussed in connection with the headstock assembly. This tightening should continue until there is a resistance to rotary and sliding motion, but sufficient freedom for the carriage to be moved along the column by hand. After this has been accomplished, the set screws 59 in the headstock assembly are progressively tightened to provide a gentle but positive pressure of the brass slugs 60 against the edge of the bar 58, and this action will bring the carriage into angular alignment with the headstock, with the bar 58 still free to slide with respect to the headstock. The corresponding set screws are then progressively tightened in the tailstock assembly to produce the same effect, with the result that the three main components of the machine are now angularly aligned. In this procedure, it is then desirable to back off the tailstock set screws slightly in order to permit the tailstock to be clamped solidly with respect to the column.

Figure 26:
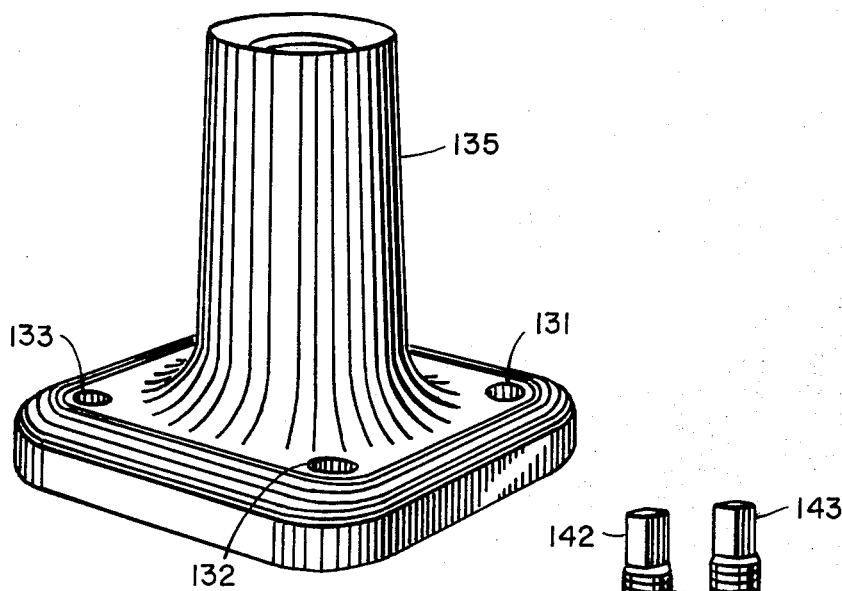
FIG. 26 is a perspective view on an enlarged scale showing the tool post preferred for installation on the top of the cross-slide assembly.
Figure 27:
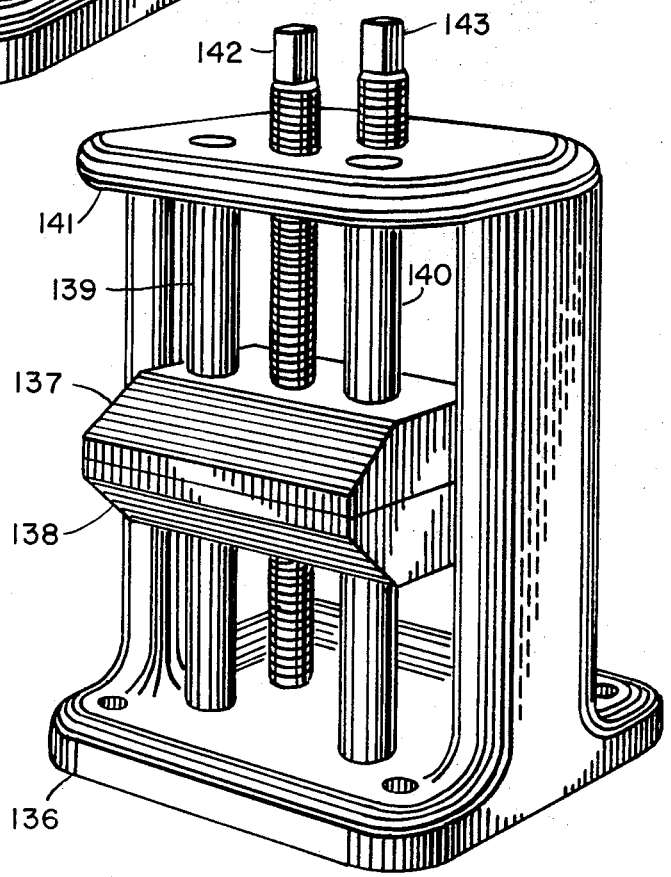
FIG. 27 is a perspective view of a milling vise preferred for installation on the top of the cross-slide, as an alternate to the tool post shown in FIG. 26.

With these adjustments made, the machine may now be made ready for the particular type of operation to be performed. If this is primarily a lathe operation, the tool post shown on FIG. 26 is installed on the top surface 130 of the cross-slide, with suitable bolts traversing the holes 131–133 (with an additional hole not appearing in FIG. 26) and having threaded engagement with the holes 134 in the cross-slide. The height of the pedestal 135 places a conventional cutting tool assembly (not shown) at the axis of rotation of the chuck 49, this permitting clearance between the cross-slide surface 130 and this axis for receiving a milling vise of the type shown on FIG. 27 for other operations. The base 136 of this vise is preferably laid out with bolt holes in the same pattern as that of the tool post shown on FIG. 26. The vise jaws 137 and 138 are slideably received on the rods 139 and 140, which are fixed with respect to the base 136 and the top 141. A clamping screw 142 is received with clearance in the top 141, and has threaded engagement with the jaws 137 and 138 of opposite hand. The feed screw 143 has threaded engagement with one of the jaws 137 or 138, and also threaded engagement with the top 141. Adjustment of the screw 143 will therefore move the jaws vertically together, either before or after a clamping action has been generated by the screw 142.

I claim:

1. A machine having a supporting beam with a substantially constant cross-section along an axis of extension, and also having a plurality of members slidably mounted on said beam for relative axial movement along said beam, wherein the improvement is a system for maintaining the relative angular position of said members about said axis comprising:

a bar normally carried by one of said members in a position parallel to said axis, at least one other of said members having means slideably engageable with said bar in closely-fitting relationship therewith to prevent angular misalignment between said members; and means normally securing one of said members to said beam against angular displacement about said axis.

2. A machine as defined in claim 1, wherein one of said members is a lathe headstock, and another of said members is a carriage operable in conjunction with said headstock.

3. A machine as defined in claim 2, wherein said headstock and carriage are normally interconnected by a feed screw.

4. A machine as defined in claim 1, wherein said bar is normally fixed with respect to a member slideably mounted on said beam, said bar being slideably received in a member normally fixed with respect to said beam.

5. A machine as defined in claim 1, wherein said beam is circular in outside cross-section.

6. A machine as defined in claim 1, wherein said beam is the column of a drill press.

7. A machine as defined in claim 1, wherein said members slideably engaging said bar include means adapted to apply a predetermined degree of clamping action on said bar.

8. A machine as defined in claim 7, wherein said members moveable on said beam include means adapted to apply a predetermined degree of clamping action on said beam.

9. A machine as defined in claim 1, wherein said bar engages at least two members fixed with respect to said beam.

10. A machine as defined in claim 9, wherein at least one of said members moveable with respect to said beam is interposed between said members fixed with respect to said beam.

11. A machine as defined in claim 10, wherein said bar is normally fixed with respect to said interposed moveable member.

12. A machine as defined in claim 1, wherein a feed screw interconnects two members moveable relatively along said beam.

13. A machine as defined in claim 1, wherein said bar is rectangular in cross-section, said cross-section having a greater dimension in a direction tangential to the axis of said beam than in a direction radial thereto.

14. A machine as defined in claim 13, wherein a feed screw interconnects two relatively moveable members on said beam, said feed screw being laterally disposed with respect to said beam in a direction parallel to said greater dimension.

15. A machine as defined in claim 14, wherein said bar is received in outwardly-open recesses in said members.

16. In combination with a beam structure including a principal section and a section extending transversely thereto from a junction of said sections, an assembly of machine components comprising:

a headstock unit received on said principal section and normally fixed with respect thereto;

a carriage unit slideably mounted on said principal section; and an alignment bar normally carried by one of said units in a position parallel to said principal section, the other of said units having means slidably engagable with said bar in closely-fitting relationship therewith to prevent angular misalignment between said units; and means normally securing one of said units to said principal section against angular displacement there-about.

17. A combination as defined in claim 16, wherein said bar is fixed with respect to said carriage unit, and has clearance with respect to said beam structure at said junction.

18. A combination as defined in claim 17, wherein said principal and transversely-extending sections are normally horizontal, and said transversely extending section extends to the rear with respect to said carriage unit.

19. A combination as defined in claim 16, wherein said headstock has a portion reaching over the junction of said beam structure at said junction, said headstock portion supporting a driving pulley in a position on the opposite side of said transversely-extending section from said carriage unit.

* * * * *